(12) United States Patent
Petrany et al.

(10) Patent No.: US 10,544,567 B2
(45) Date of Patent: Jan. 28, 2020

(54) METHOD AND SYSTEM FOR MONITORING A ROTATABLE IMPLEMENT OF A MACHINE

(71) Applicant: Caterpillar Inc., Peoria, IL (US)

(72) Inventors: Peter Petrany, Dunlap, IL (US); Douglas Jay Husted, Secor, IL (US)

(73) Assignee: Caterpillar Inc., Peoria, IL (US)

( * ) Notice: Subject to any disclaimer, the term of this patent is extended or adjusted under 35 U.S.C. 154(b) by 97 days.

(21) Appl. No.: 15/851,883

(22) Filed: Dec. 22, 2017

(65) Prior Publication Data
US 2019/0194913 A1    Jun. 27, 2019

(51) Int. Cl.
*E02F 9/26*    (2006.01)
*G06T 19/00*    (2011.01)

(52) U.S. Cl.
CPC .............. *E02F 9/265* (2013.01); *E02F 9/261* (2013.01); *G06T 19/006* (2013.01)

(58) Field of Classification Search
CPC ......... E02F 9/265; E02F 9/261; G06T 19/006
USPC ....................................................... 701/34.4
See application file for complete search history.

(56) References Cited

U.S. PATENT DOCUMENTS

| | | |
|---|---|---|
| 8,315,789 B2 | 11/2012 | Dunbabin et al. |
| 9,030,332 B2 | 5/2015 | Tafazoli Bilandi et al. |
| 9,206,588 B2 | 12/2015 | Wu et al. |
| 9,598,836 B2 * | 3/2017 | Hargrave, Jr. .......... E02F 9/262 |
| 2014/0204215 A1 | 7/2014 | Kriel et al. |
| 2015/0235398 A1 | 8/2015 | Kim et al. |
| 2015/0245017 A1 | 8/2015 | Di Censo et al. |
| 2015/0343976 A1 | 12/2015 | Lim et al. |
| 2015/0376868 A1 | 12/2015 | Jackson |
| 2016/0138248 A1 | 5/2016 | Conway et al. |
| 2016/0138249 A1 | 5/2016 | Conway et al. |

(Continued)

FOREIGN PATENT DOCUMENTS

| | | |
|---|---|---|
| JP | 2009121053 | 6/2009 |
| JP | 2009121053 A | 6/2009 |

(Continued)

OTHER PUBLICATIONS

International Search Report and Written Opinion related to Application No. PCT/US2018/061190 dated Feb. 22, 2019.

*Primary Examiner* — Muhammad Shafi
(74) *Attorney, Agent, or Firm* — Miller, Matthias & Hull (57) ABSTRACT

A method, for monitoring an implement of a machine, includes receiving implement parameters associated with the implement and determining a range of movement of the implement based on the implement parameters. The method detects whether at least one object is located within the range of movement of the implement and displays a visual representation of the range of movement with a visual indication indicative of whether the at least one object is located within the range of movement. The method detects changes to the implement parameters and determines an updated range of movement based on the detected changes. Further, the method determines whether at least one object is located within the updated range of movement and displays a visual representation of the updated range of movement with an updated visual indication indicative of whether the at least one object is located within the updated range of movement.

16 Claims, 9 Drawing Sheets

(56) References Cited

U.S. PATENT DOCUMENTS

| | | | |
|---|---|---|---|
| 2016/0176338 A1* | 6/2016 | Husted | E02F 9/261 |
| | | | 340/435 |
| 2016/0344931 A1* | 11/2016 | Husted | H04N 5/23238 |
| 2017/0061689 A1* | 3/2017 | Petrany | G06T 19/006 |
| 2017/0191246 A1 | 7/2017 | Friend et al. | |

FOREIGN PATENT DOCUMENTS

| | | |
|---|---|---|
| KR | 1020130097913 | 9/2013 |
| KR | 1020130097913 A | 9/2013 |
| KR | 1020150061822 | 6/2015 |
| KR | 1020150061822 A | 6/2015 |
| KR | 101787897 | 10/2017 |
| KR | 101787897 B1 | 10/2017 |

* cited by examiner

METHOD AND SYSTEM FOR MONITORING A ROTATABLE IMPLEMENT OF A MACHINE

TECHNICAL FIELD

The present disclosure relates generally to an implement of a machine. More particularly, the present disclosure relates to a method and system for monitoring the implement of the machine.

BACKGROUND

Many industrial machines, such as electric rope or power shovels are known to have implements that are rotatable about a swing axis of the machine to perform one or more operations at a worksite. Operators of such machines need to be aware of the machine surroundings to perform smooth operations at the worksite. However, the operator can directly see only a portion of surroundings of the machines, such as the surroundings that are visible from the front and/or the rear window of the machine. There exist a number of blind spots around the machine at the worksite, that may not be directly visible to the operator during operation of the machine. Therefore, precise control of the implement to position the implement accurately at the worksite becomes a challenge for the operator.

U.S. Pat. No. 9,030,332 (hereinafter referred to as the '332 patent) relates to a method, apparatus and system for generating an indication of an object within an operating ambit of heavy loading equipment. The system includes a plurality of sensors disposed about a periphery of the loading equipment, each being operable to generate a proximity signal in response to detecting an object within a coverage region of the sensor. The proximity signal includes an indication of at least an approximate distance between the sensor and the object. A processor circuit is operably configured to define an alert region extending outwardly and encompassing swinging movements of outer extents of the loading equipment. The processor circuit is operably configured to receive proximity signals from the plurality of sensors, process the signals to determine a location of the object relative to the loading equipment, and initiate an alert when the location falls within the alert region.

SUMMARY

In one aspect, a method for monitoring an implement of a machine is provided. The method includes receiving one or more implement parameters associated with the implement and determining a range of movement of the implement based on the one or more implement parameters. The method further includes detecting that whether at least one object is located within the range of movement of the implement and displaying a visual representation of the range of movement with a visual indication indicative of whether the at least one object is located within the range of movement. Furthermore, the method includes detecting one or more changes to the one or more implement parameters and determining an updated swing path based on the one or more changes. The method further determines whether at least one object is located within the updated range of movement of the implement and displaying a visual representation of the updated range of movement with an updated visual indication indicative of whether the at least one object is located within the updated range of movement.

In another aspect of the present disclosure, a system for monitoring an implement of a machine is provided. The system includes one or more implement sensors, one or more object detection modules, and a controller. The one or more implement sensors are configured to monitor one or more implement parameters associated with the implement. The one or more object detection modules are configured to detect at least one object proximal to the machine and generate a signal including position data associated with the at least one object. The controller is communicably coupled to the one or more implement sensors and the one or more object detection modules. The controller is configured to receive one or more implement parameters associated with the implement and determine a range of movement of the implement based on the one or more implement parameters. The controller further detects that whether at least one object is located within the range of movement of the implement and displays, on a display device, a visual representation of the range of movement with a visual indication indicative of whether the at least one object is located within the range of movement of the implement 104. Furthermore, the controller detects one or more changes to the one or more implement parameters and determines an updated range of movement based on the one or more changes. The controller further determines whether at least one object is located within the updated range of movement of the implement and displays a visual representation of the updated range of movement with an updated visual indication indicative of whether the at least one object is located within the updated range of movement.

In a yet another aspect of the present disclosure, a machine is provided. The machine includes an implement, one or more implement sensors, one or more object detection modules and a controller communicably coupled to the one or more implement sensors and the one or more object detection modules. The one or more implement sensors are configured to monitor one or more implement parameters associated with the implement. The one or more object detection modules is configured to detect at least one object proximal to the machine and generate a signal including position data associated with the at least one object. The position data includes a distance between the at least one object and the machine. The controller is configured to receive one or more implement parameters associated with the implement and determine a range of movement of the implement based on the one or more implement parameters. The controller further detects, using the one or more object detection modules, that whether at least one object is located within the range of movement of the implement and displays, on a display device, a visual representation of the range of movement with a visual indication indicative of whether the at least one object is located within the range of movement of the implement. Furthermore, the controller detects one or more changes to the one or more implement parameters and determines an updated range of movement based on the one or more changes. The controller further determines, using the one or more object detection modules, whether at least one object is located within the updated range of movement of the implement and displays a visual representation of the updated range of movement with an updated visual indication indicative of whether the at least one object is located within the updated range of movement of the implement.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
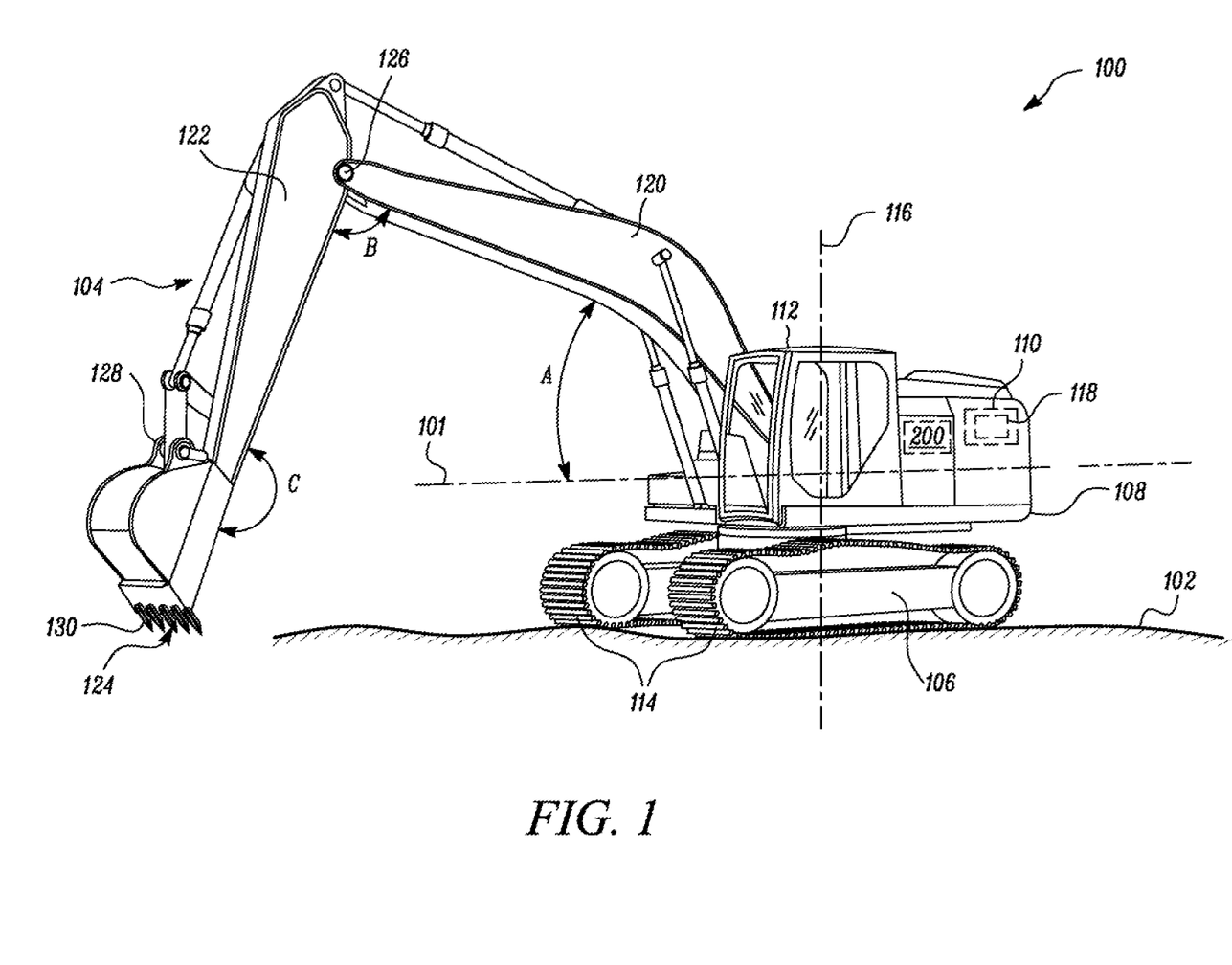
FIG. 1 illustrates an exemplary machine having an implement, in accordance with an embodiment of the present disclosure.

The present disclosure relates to a system and method for monitoring movements of an implement of a machine. FIG. 1 illustrates an exemplary machine 100 operating at a worksite 102. The machine 100 defines a longitudinal axis 101 along a length of the machine 100. The worksite 102 may include, for example, a mine site, a landfill, a quarry, a construction site, or any other type of worksite. In some embodiments of the present disclosure, the machine 100 includes an implement 104 configured to move to perform digging and/or dumping operations. As illustrated in FIG. 1, the machine 100 is embodied as a hydraulic excavator having the implement 104 configured to remove/dig material from one location at the worksite 102 and dump the material at another location at the worksite 102. However, in various other embodiments, the machine 100 may be any other machine having a moveable implement or any other moveable component, such as a dump body of a dump truck, a rear frame of an articulated truck, etc. Further, the machine 100 may be a manned machine or an unmanned machine. In some embodiments, the machine 100 may be a machine having various level of autonomy, such as a fully-autonomous machine, a semi-autonomous machine, a remotely operated machine, or remotely supervised machine.

As illustrated in FIG. 1, the machine 100 may include a lower frame 106, an upper frame 108, a power generation unit 110, an operator cabin 112 and a plurality of traction devices 114, such as tracks or wheels, for propelling the machine 100 at the worksite 102. The upper frame 108 is rotatably mounted on the lower frame 106 and configured to rotate about a swing axis 116, to rotate and move the implement 104 from a digging location to a dumping location and back to the digging location.

The power generation unit 110 may include a power source 118 in the form of an engine or an electric motor that is configured to produce power to operate various components of the machine 100. Further, the operator cabin 112 may be an enclosure that may include one or more of electronic panels, displays, buttons, joysticks and various other physically actuable entities. It may further be contemplated that the operator cabin 112 may be remotely located in case of a remotely operated machine 100.

The implement 104 includes a boom 120, a stick 122, and a work tool 124, configured to be moved by using one or more hydraulic actuators. An end of the boom 126 may be coupled to the upper frame 108 of the machine 100 at a pivot joint (not shown), while the other end of the boom 120 is coupled to the stick 122 at a pivot joint 126. Another end of the stick 122 may be coupled to the work tool 124 at a pivot joint 128. Generally, the boom 120 forms a boom angle (shown as angle A) with the machine 100 (such as with respect to the longitudinal axis 101 of the machine 100), and forms a stick angle, shown as angle B, with the stick 122, which may vary according to the various elevation levels and positions of the boom 120 and the stick 122.

As illustrated, the work tool 124 is in the form of a bucket or a digger. However, in other embodiments of the present disclosure, other types of work tools, such as, but not limited to, blades, scrapers, grapples, or the like may be employed by the machine 100. As shown in FIG. 1, the work tool 124 may include a number of blades 130. The work tool 124 is configured to move between a closed position and an open position with respect to the stick 122, thereby varying a work tool angle, shown as angle C, between the stick 122 and the work tool 124. It may be contemplated that one or more of the boom angle (angle A), the stick angle (angle B) and work tool angle (angle C) may vary as the machine 100 operates to perform the various operations at the worksite 102. While operating the machine 100, an operator of the machine 100 needs to be aware of the surroundings of the machine 100, to accommodate these changes and operate the implement 104 freely.

In some embodiments of the present disclosure, the machine 100 includes a control system 200 for monitoring and controlling the operations of the implement 104, and other operations of the machine 100. The control system 200 may include suitable logic, circuitry, and/or interfaces that are configured to control the various operations of the machine 100 at the worksite 102. Additionally, the control system 200 may be configured to monitor the worksite 102, and accordingly, control the operations of the machine 100. A person having ordinary skill in the art would appreciate that the scope of the disclosure is not limited to include the control system 200 provided onboard the machine 100. In some embodiments, the control system 200, or portions of the control system 200, may be implemented remotely with respect of the machine 100, without departing from the scope of the disclosure. The control system 200 is further explained in greater detail with reference to FIG. 2 through FIG. 9 in the following description.

Figure 2:
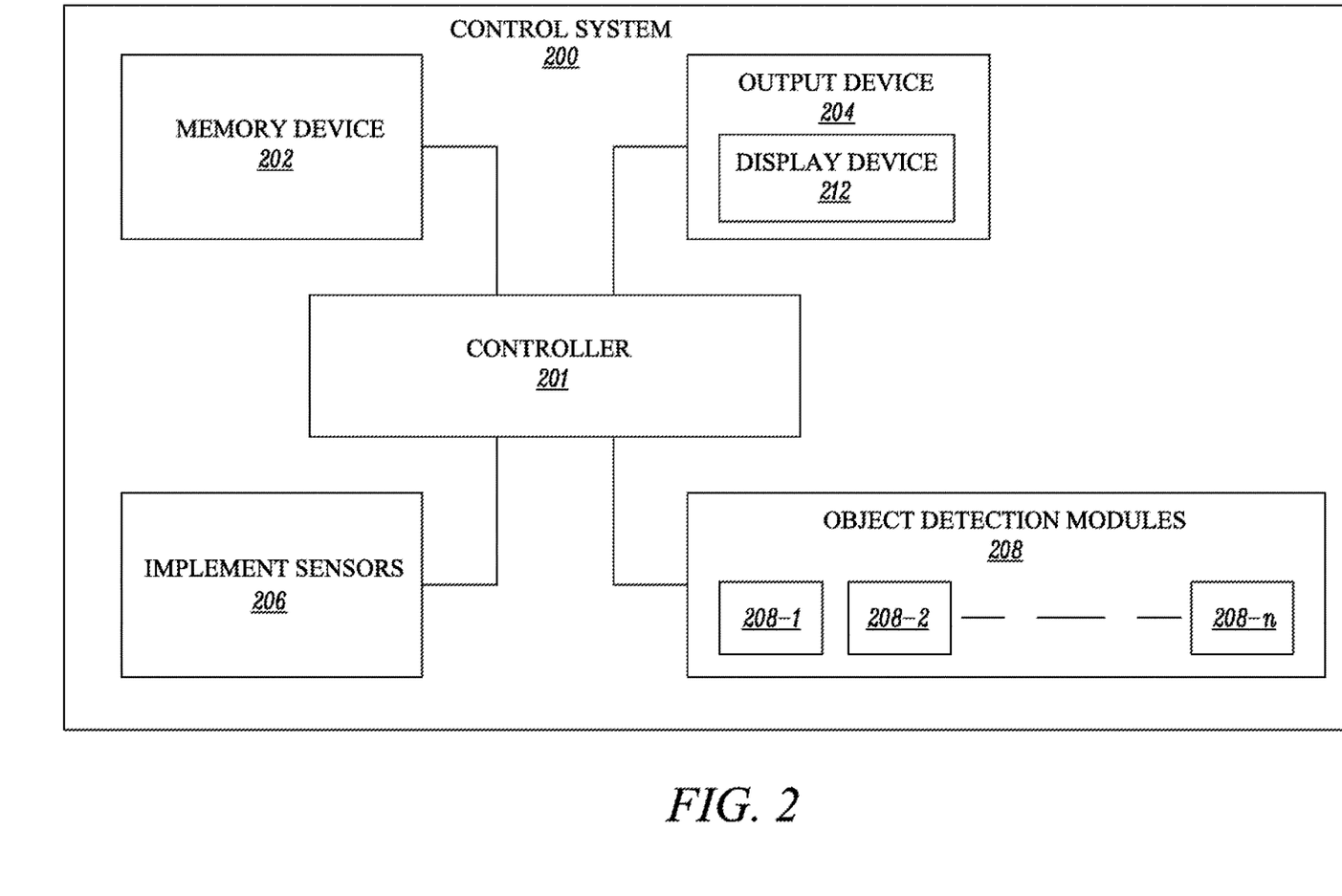
FIG. 2 illustrates a block diagram of a system for monitoring the implement of the machine, in accordance with the embodiment of the present disclosure.

Referring now to FIG. 2, the control system 200 includes a controller 201, a memory device 202, an output device 204, one or more implement sensors 206, and one or more object detection modules 208. Additionally, or alternatively, the control system 200 may include fewer or additional elements.

The controller 201 is communicably coupled to the memory device 202, the output device 204, the one or more implement sensors 206, and the object detection modules 208. The controller 201 is configured to execute the instruction stored in the memory device 202 to perform predetermined operations. For example, the controller 201 may be configured to control the operation of the machine 100 at the worksite 102. The controller 201 may be implemented using one or more controller technologies, such as Application Specific Integrated Circuit (ASIC), Reduced Instruction Set Computing (RISC) technology, Complex Instruction Set Computing (CISC) technology, etc.

The memory device 202 is configured to store a set of instructions that are executable by the controller 201 to perform the predetermined operation (for example, controlling the operations of the machine 100). The memory device 202 may include, but are not limited to, a Random-Access Memory (RAM), a Read Only Memory (ROM), a Hard Disk Drive (HDD), and a Secure Digital (SD) card. The output device 204 is configured to provide an output to an operator of the machine 100 in the form of audio, video, textual and/or any other form of output based on instructions received from the controller 201. The output device 204 may be positioned within the operator cabin 112 of the machine 100 and/or may be remotely located with respect to the machine 100 and the worksite 102. In some embodiments, the output device 204 may include a display device 212 positioned within the operator cabin 112 of the machine 100. Alternatively, or additionally, the output device 204 may include an audio output device, a textual output device, or the like positioned within the operator cabin 112.

In some embodiments, the one or more implement sensors 206 may be positioned on the implement 104, such as on the boom 120, the stick 122, the work tool 124, and/or the hydraulic actuators. Alternatively, the one or more implement sensors 206 may be positioned on a front end of the upper frame 108 proximal to the swing axis 116 of the machine 100. The one or more implement sensors 206 may be configured to monitor (or obtain) one or more implement parameters associated with the implement 104 of the machine 100. Each of the one or more implement sensors 206 is configured to generate and transmit a signal to the controller 201 including the monitored one or more implement parameters. In some embodiments of the present disclosure, the one or more implement parameters may include one or more of an angle of the boom 120 (or the boom angle shown as angle A), an angle of the stick 122 (or the stick angle shown as angle B in FIGS. 1 and 3), and the angle of the work tool 124 (or the work tool angle shown as angle C), length of the boom 120, length of the stick 122, etc.

Examples of the one or more implement sensors 206 may include, but not limited to, an accelerometer, gyroscope, a LIDAR (Light Detection and Ranging) sensor, a radar sensor, a perception sensor, a mono camera sensor, a stereo camera sensor, a cylinder position sensor, or the like. The one or more implement sensors 206 may be positioned on the machine 100 and/or the hydraulic actuators of the implement 104, and may be configured to generate and transmit a signal, to the controller 201, including the monitored boom angle (shown as angle A), stick angle (shown as angle B), work tool angle (shown as angle C), length of the boom 120, and/or length of the stick 122, etc.

According to the embodiments of the present disclosure, the controller 201 is communicably coupled to the one or more implement sensors 206 and configured to receive the monitored one or more implement parameters associated with the implement 104. The controller 201 may further determine a distance D (such as the distance D shown in FIG. 3) between the swing axis 116 of the machine 100 and a tip of the implement 104 extending out from the machine 100, based on the monitored one or more implement parameters received from the one or more implement sensors 206. The tip of the implement 104 may be defined as the farthest point on the implement 104 from the front end of the machine 100 that lies along the longitudinal axis 101 of the machine 100. It may be contemplated that the tip of the implement 104 extending out from the machine 100 may change according to the position of the boom 120, the stick 122 and the work tool 124.

Figure 3:
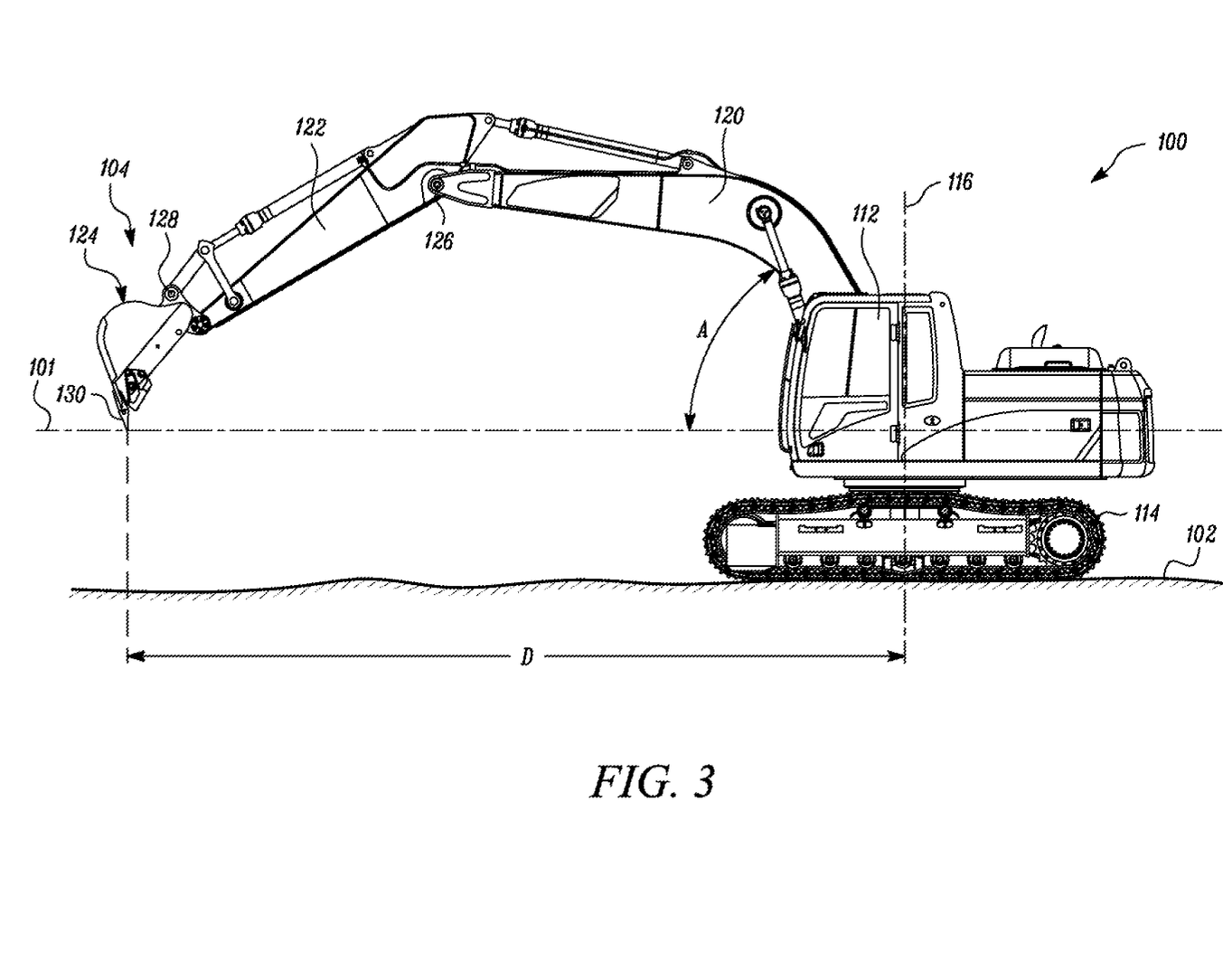
FIG. 3 illustrates the machine with the implement in an extended position, in accordance with the embodiment of the present disclosure.
Figure 4:
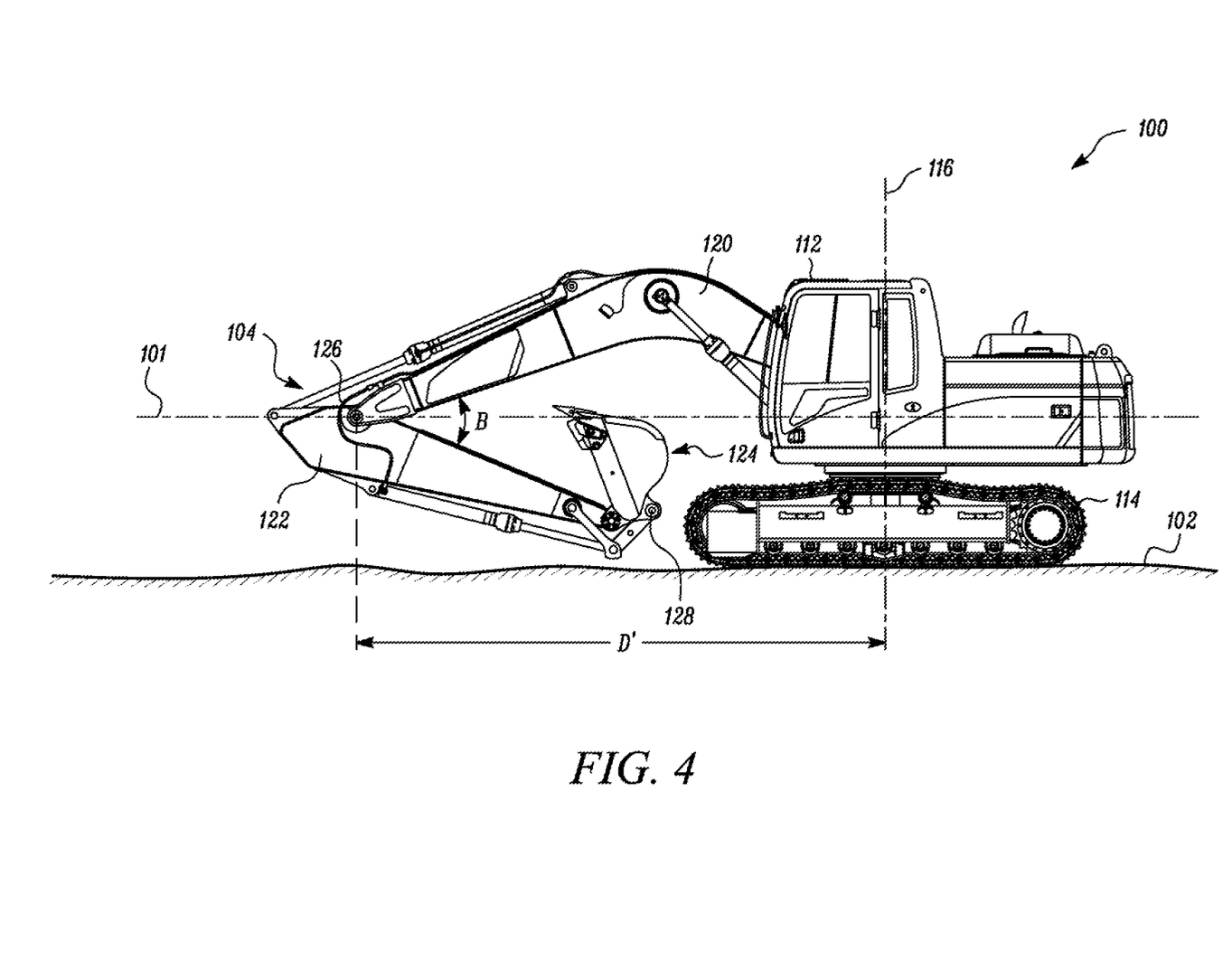
FIG. 4 illustrates the machine with the implement in a retracted position, in accordance with the embodiment of the present disclosure.

In some embodiments, the distance D is determined between a first end point defined on the swing axis 116 of the machine 100, and a second end point defined at the tip of the implement 104 extending out from the machine 100. For example, when the work tool 124 is in an open position and the boom 120 and the stick 122 are also in their stretched position where the stick angle (angle B) is between 90 degrees and 180 degrees (as shown in FIG. 3), the blades 130 of the work tool 124 correspond to the second end point for measuring the distance D. Further, when the work tool 124 is in a closed position (as shown in FIG. 4), the pivot joint 126 between the boom 120 and the stick 122 becomes the second end point for measuring the distance D (indicated as D' in FIG. 4). It may be contemplated that the distance D increases as the implement 104 and/or the work tool 124 move to the open position. Therefore, it may be contemplated that the distance D, shown in FIG. 3 will be greater than the distance D', shown in FIG. 4. Although only two examples of distance, i.e., D, and D' are illustrated and described herein, it may be understood that further variations in the measurement of the distance are also possible and within the scope of the claimed subject matter.

In some embodiments, the controller 201 is configured to receive the monitored boom angle (angle A), stick angle (angle B), and/or the work tool angle (angle C), length of the boom 120, length of the stick 122 and subsequently determine the distance D. D' between the tip of the implement 104 extending out from the machine 100 and the swing axis 116 of the machine 100 based on the received data. For example, the controller 201 may be configured to determine the distance D, D' based on a look up table stored in the memory device 202 having the value of distance D, D' between the tip of the implement 104 extending out from the machine 100 and the swing axis 116 of the machine 100 corresponding to various values of the boom angle (angle A), the stick angle (angle B) and the work tool angle (angle C), and the lengths of the boom 120 and the stick 122, etc. It may be contemplated that other methods of calculating and/or determining the distance D. D', such as trigonometric equations, may also be used without deviating from the scope of the claimed subject matter.

Figure 5:
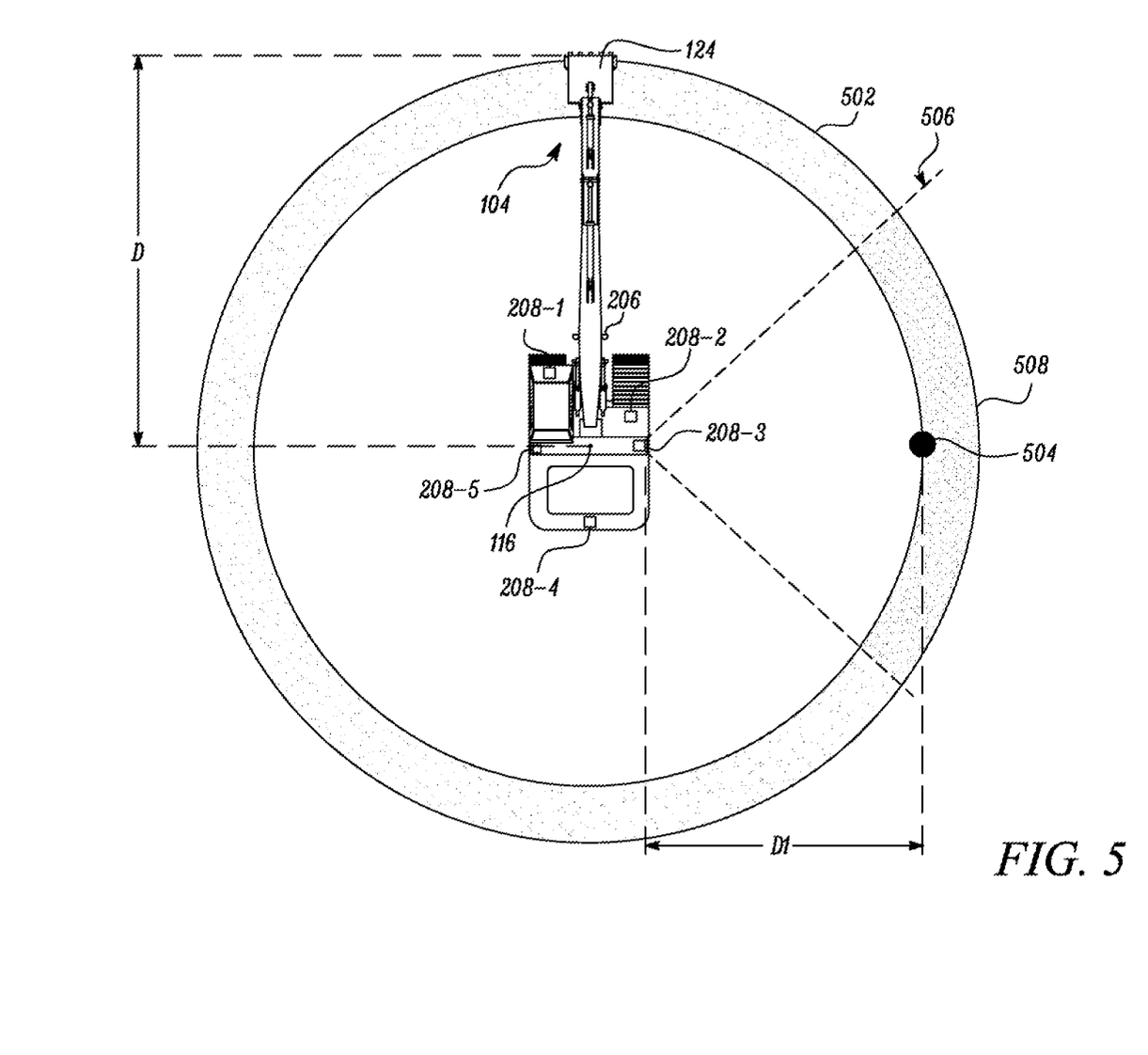
FIG. 5 illustrates a swing path of the implement of the machine, in accordance with the embodiment of the present disclosure.

Further, the controller 201 is configured to determine a range of movement of the moveable component (i.e., the implement 104 of the machine 100) based on the monitored one or more implement parameters received from the one or more implement sensors 206. In some embodiments, the range of movement is a circular swing path of the rotatable implement 104 and the controller 201 is configured to determine the circular swing path of the implement 104 based on the determined distance D. D' between the swing axis 116 of the machine 100 and the tip of the implement 104 extending out from the machine 100. Further, the controller 201 is configured to display a visual representation of the determined range of movement of the implement 104 on the display device 212 associated with the machine 100. For example, the operator positioned inside the operator cabin 112 or remotely may view the range of movement of the implement 104 and operate the machine 100 accordingly. An exemplary range of movement. i.e., a circular swing path 502 of the implement 104 of the machine 100 is depicted in FIG. 5.

Further, the controller 201 is configured to determine a radius R of the circular swing path 502 based on the distance D, D' between the tip of the implement 104 extending out of the machine 100 and the swing axis 116 of the machine 100. In some embodiments of the present disclosure, the radius R of the swing path 502 is equal to or greater than the determined distance D. D', to have an adequate margin while operating the implement 104 of the machine 100 at the worksite 102.

In some embodiments of the present disclosure, the visual representation of the swing path 502 is displayed on the display device 212 associated with the machine 100. In one example, the visual representation of the swing path 502 is a three-dimensional (3-D) augmented reality representation displayed on the display device 212 positioned inside the operator cabin 112 of the machine 100 (such as that shown in FIGS. 7 and 8). In some embodiments, the display device 212 may be implemented on a window (such as window 702 shown in FIGS. 7 and 8) of the operator cabin 112 and the 3-D augmented reality representation of the swing path 502 is displayed on the window of the machine 100. Additionally, or alternatively, the display device 212 may be positioned on a center console (not shown) within the operator cabin 112. In some embodiments, the visual representation of the swing path 502 may be a standard two-dimensional (2-D) view displayed on the display device 212.

Further, the one or more object detection modules 208 may be positioned on the machine 100 and configured to detect an object proximal to the machine 100 at the worksite 102. Examples of the object may include another machine, a person or any other object present in proximity to the machine 100 at the worksite 102. In some embodiments of the present disclosure, the control system 200 includes a plurality of object detection modules 208, such as the object detection modules 208-1, 208-2 . . . 208-n (hereinafter collectively referred to as the object detection modules 208) disposed about a periphery of the machine 100 (as shown clearly in FIG. 5). In some implementations, the object detection modules 208 may be implemented using sensing modules including sensor devices and transceivers that are configured to detect the object detected in proximity to the machine 100 and to transmit and receive data, such as position data, pertaining to the object detected in proximity to the machine 100. The position data pertaining to the detected object may include, but not limited to, a distance of the object from the machine 100, coordinates of the location of the object at the worksite 102, etc.

Each of the object detection module 208 has a respective coverage region that extends outwardly from the respective object detection module in three-dimensional (3D) space. Each of the object detection module 208 is configured to detect an object (such as an object 504 shown in FIG. 5) within its respective coverage region. In some embodiments of the present disclosure, the object detection modules 208 may include one or more sensors (such as radar sensors, LIDAR (Light Detection and Ranging) sensors, and/or the like) that are configured to generate a signal in response to detecting an object within its respective coverage region. The signal includes position data pertaining to the detected object, such as an indication of at least an approximate distance between the respective object detection module 208 and the detected object, thereby indicating a distance between the detected object and the machine 100 (since the object detection module 208 is positioned on the machine 100). In some embodiments, the object detection modules 208 may include ultrasonic proximity sensor or lasers to generate proximity signals.

Alternatively, or additionally, the object detection modules 208 may be positioned on the worksite 102 to locate one or more objects proximal to the machine 100. For example, the object detection modules 208 may include cameras and GPS (Global Positioning System) detectors to identify the object present in proximity of the machine 100. In such a case, the position data may include GPS coordinates of location of the detected object in proximity to the machine 100. In some embodiments, each of the object detection modules 208 may be identical to one another. In some embodiments, the object detection modules 208 may be different from one another.

Further, the controller 201 is configured to receive the position data associated with at least one object 504 (shown in FIG. 5) detected in proximity of the machine 100 from the one or more object detection modules 208. In one example, when the object detection modules 208 are positioned on the machine 100, the position data may include a distance D1 between the object 504 and the machine 100. The controller 201 may additionally receive an identity information associated with the respective object detection module 208 (such as a unique identifier and the positioning of the object detection module 208 on the machine 100), and the information regarding the coverage range of the respective object detection module 208, along with the position data from each of the object detection modules 208. In the example illustrated in FIG. 5, the object detection module 208-3 detects the object 504 within its coverage region 506 and generates and transmits the signal, including the distance D1 between the object 504 and the machine 100 to the controller 201. Additionally, the controller 201 is configured to identify the object detection module 208-3 and its coverage range 506 based on the identity information and the coverage range information received from the object detection module 208-3.

Further, the controller 201 is configured to detect if the object 504 is located within the range of movement of the implement 104 (i.e., the swing path 502 of the implement 104). In some embodiments, the controller 201 compares the distance D1 between the object 504 and the machine 100 with a threshold value, and if the distance D1 is less than or equal to the threshold value, then the controller 201 determines that the object 504 is located within the range of movement of the implement 104 i.e., the swing path 502. In some embodiments of the present disclosure, the threshold value is equal to or greater than the radius R of the swing path 502 of the implement 104, to accommodate an adequate operating range of the implement 104.

In some alternative embodiments, the position data may include coordinates of location (such as GPS coordinates), hereinafter referred to as the location coordinates, of the object 504 within the worksite 102. In this case, the controller 201 may be configured to determine the distance D1 between the object 504 and the machine 100 based on the location coordinates of the object 504 and the machine 100. Subsequently, the controller 201 may compare the determined distance D1 with the threshold value and determine that the object 504 lies within the range of movement of the implement 104, i.e., the swing path 502 of the implement 104, when the distance D1 is less than or equal to the threshold value.

In some other embodiments, the controller 201 may be configured to determine coordinates of location (such as the GPS location coordinates) of the determined range of movement (i.e., the swing path 502) of the implement 104 and the location coordinates of the detected object 504. The coordinates of location of the range of movement may be determined based on the GPS coordinates of location of the worksite 102, the machine 100, and the implement 104. The coordinates of location of the range of movement of the implement 104 may be further based on the one or more monitored implement parameters received from the one or more implement sensors 206. Further, based on the coordinates of location of the machine 100, the range of movement of the implement 104 (i.e., the swing path 502), and the object 504, the controller 201 may detect if the location of the object 504 lies within the location coordinates of the range of movement of the implement 104. It may be contemplated that the description and the claimed subject matter is not intended to be limited to aforementioned methods of detecting the object 504 located within the range of movement of the implement 104, and that other methods may also be implemented without deviating from the scope of the claimed subject matter to achieve similar results.

Figure 7:
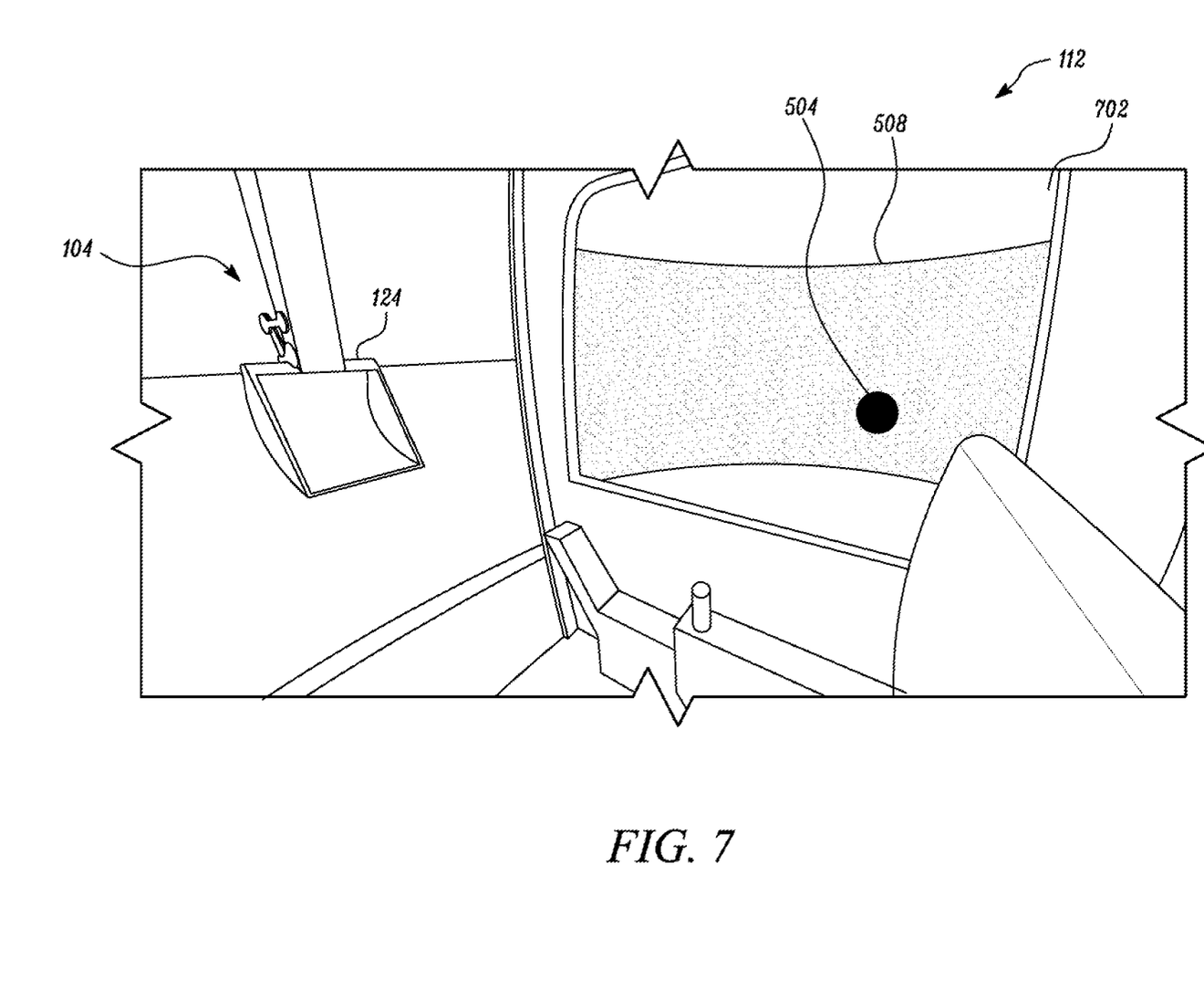
FIG. 7 illustrates an operator cabin of the machine displaying a portion of the swing path along with a visual indication of an object located within the swing path of the implement, in accordance with the embodiment of the present disclosure.
Figure 8:
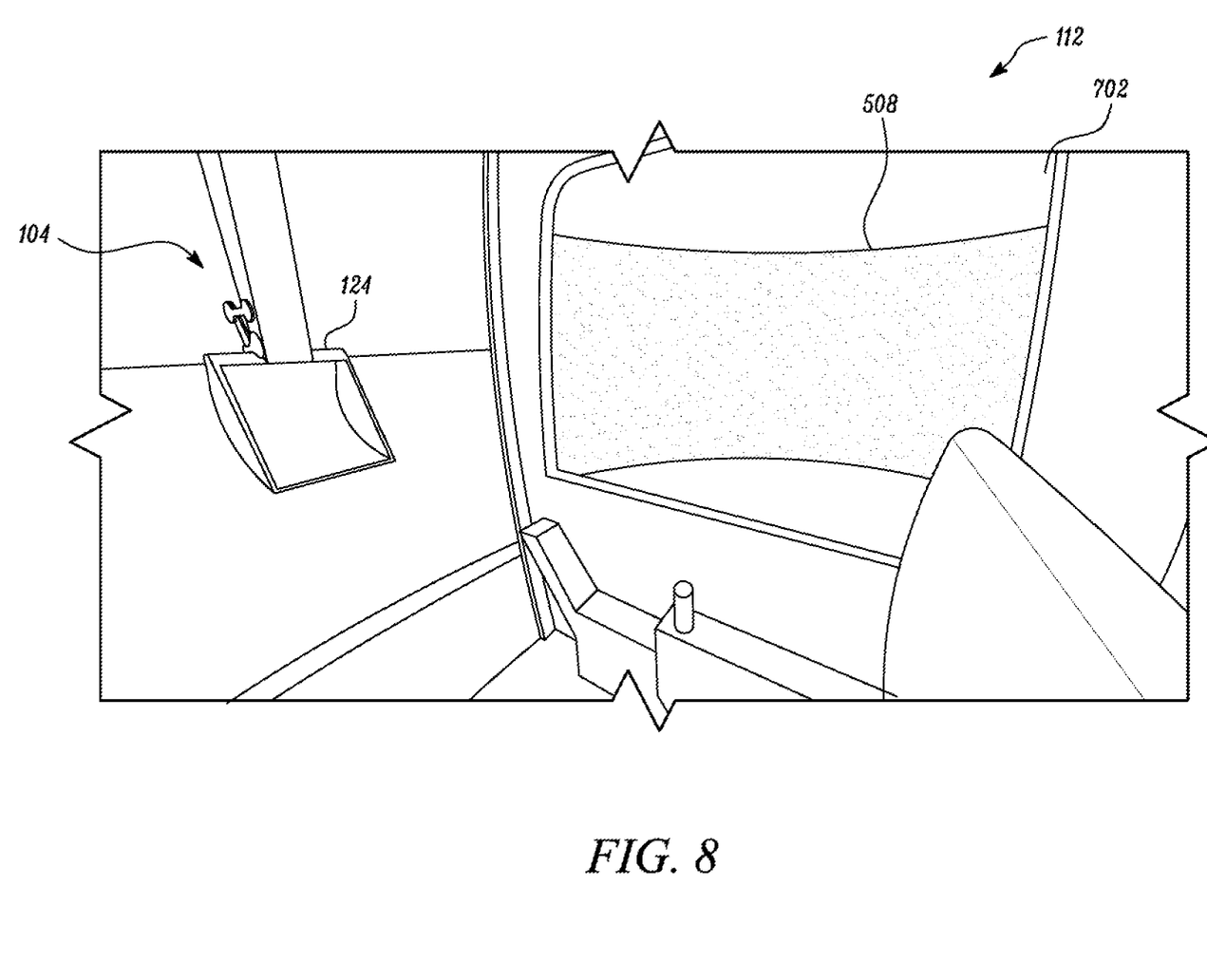
FIG. 8 illustrates the operator cabin of the machine displaying a portion of the updated swing path along with a visual indication of absence of any object within the updated swing path of the implement, in accordance with the embodiment of the present disclosure.

In some embodiments, the controller 201 is configured to display a visual indication indicative of the object 504 present within the range of movement, i.e., the swing path 502 of the implement 104. In one example, the visual indication may be provided within with the displayed visual representation of the range of movement of the implement 104. In some implementations, a color-coded indication of a portion of the displayed visual representation of the range of movement (i.e., the swing path 502) in which the object 504 lies, may be provided. For example, a portion 508 of the displayed visual representation of the swing path 502 that lies within the coverage range of the object detection module 208-3 that detects the object 504, may be color coded or highlighted in Red color to indicate an obstruction zone to the operator of the machine 100 (as shown in FIG. 7), while other portions of the displayed visual representation of the swing path 502 (where there are no object(s) detected) may be color coded or highlighted in green color (as shown in FIG. 8) to indicate an obstruction free zone.

In some other embodiments of the present disclosure, the controller 201 may be configured to display an additional visual symbol of the detected object 504 on the displayed visual representation of the range of movement of the implement 104, i.e., the swing path 502, based on the position data associated with the object 504. For example, the controller 201 may use the GPS location coordinates of the detected object 504 and superimpose the visual symbol of the object 504 on the visual representation of the swing path 502 and the color coded visual indication of the portion 508, displayed on the display device 212 associated with the machine 100.

Although, the visual indication is described as color coding of the portion 508 of the displayed visual representation of the swing path 502 to indicate the object 504 located therein, it may be well contemplated that the visual indication of the detected object 504 may as well be a visual symbol to indicate the object 504 being located within the swing path 502, without deviating from the scope of the claimed subject matter.

In some embodiments, the display device 212 may be implemented on the window 702 of the operator cabin 112, as a three-dimensional (3D) augmented reality display, which may be viewed by the operator through 3-D glasses. In such a case, it may be contemplated by a person ordinarily skilled in the art that the machine 100 may additionally include other components, such as a projector, an operator facing camera, etc. (not shown) to implement the 3D augmented reality display on the window 702. Such additional components are not described herein in greater details for the sake of brevity of the present disclosure. Other 3-D display devices may also be used to achieve similar results, without deviating from the scope of the claimed subject matter. Alternatively, the display device 212 may be implemented on a standard two-dimensional screen positioned inside and/or remote of the operator cabin 112.

Figure 6:
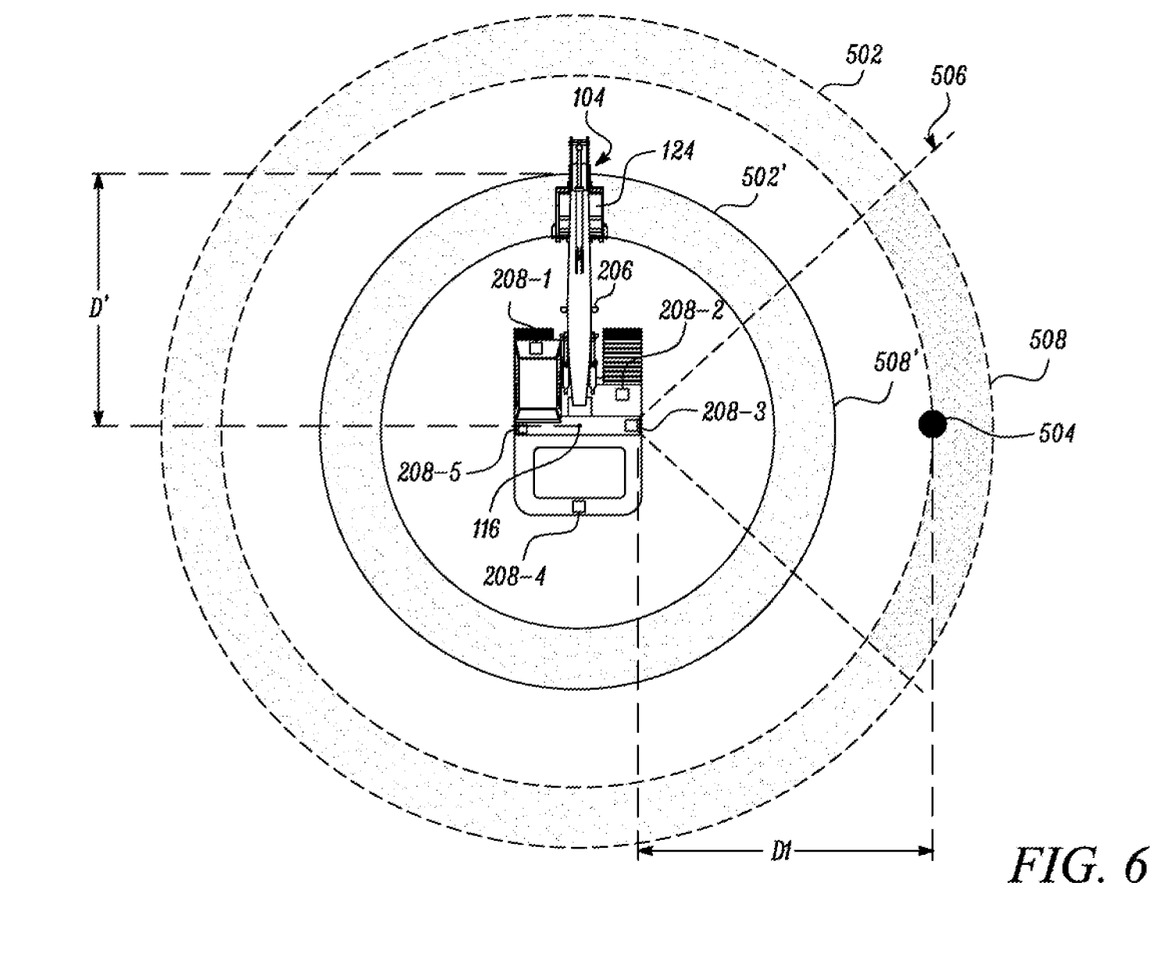
FIG. 6 illustrates an updated swing path of the implement, in accordance with an embodiment of the present disclosure.

Further, the controller 201 is configured to continuously receive inputs from the one or more implement sensors 206, and the object detection modules 208 and is configured to dynamically update the displayed visual representation of the range of movement of the implement 104 (i.e., the swing path 502), such as to updated range of movement, i.e., updated swing path 502', shown in FIG. 6. Furthermore, the controller 201 is configured to accordingly update the visual indication indicative of the object 504 present within the updated range of movement of the implement 104, i.e., the updated swing path 502' of the implement 104.

During operation of the machine 100 at the worksite 102, the implement 104 may move from one position to another and consequently, the controller 201 may detect a change to the monitored one or more implement parameters received from the one or more implement sensors 206. For example, a change in position of the work tool 124 and/or the boom 120 and/or the stick 122 may result in a change in the distance D measured between the tip of the implement 104 extending out from the machine 100 and the swing axis 116 of the machine 100 to distance D' (shown in FIG. 4). It may be contemplated that the controller 201 may determine the updated distance D' based on the changed position of the work tool 124, the stick 122 and/or the boom 120 with respect to the machine 100, in a similar manner as described previously. Alternatively, any other method of determining the updated distance D' between the tip of the implement 104 extending out from the machine 100 and the swing axis 116 of the machine 100 may be used without deviating from the scope of the claimed subject matter.

Further, the controller 201 is configured to recalculate the updated range of movement of the implement 104, i.e., the updated swing path 502' with an updated radius R' based on the updated distance D' between the tip of the implement extending out from the machine 100 and the swing axis 116 of the machine 100. Subsequently, the controller 201 is configured to display a visual representation of the updated range of movement, i.e., the updated swing path 502' on the output device 204, i.e., the display device 212 associated with the machine 100.

As shown in FIGS. 5 and 6, the object 504 is present within the range of movement i.e., swing path 502 of the implement 104 and therefore, the portion 508 of the displayed visual representation of the swing path 502, where the object 504 lies, is color coded in red to indicate obstruction zone for the implement 104 and/or additionally includes the visual symbol of the object 504 displayed therein. However, for the updated range of movement of the implement 104, the controller 201 again detects if the object 504 is located within the updated range of movement or if there is any new object located within the updated range of movement or the updated swing path 502'. Accordingly, the controller 201 is configured to display the visual representation of the updated range of movement i.e., the updated swing path 502' and an updated visual indication indicative of the object 504 and or any other object located within the updated swing path 502'. In the example shown in FIG. 6, the controller 201 determines that the distance D1 between the machine 100 and the object 504 is greater than the updated threshold (equal to or greater than the updated radius R' of the updated swing path 502'). Therefore, the object 504 is detected to be not located within the updated swing path 502' of the implement 104. Consequently, the portion 508' of the visual representation of the updated swing path 502' is displayed with an updated visual indication indicating that there is no object present within the updated swing path 502' of the implement 104. For example, the portion 508' may be color coded green color to indicate a clear operation zone for the implement 104 of the machine 100.

Similarly, if any other object detection module 208 on the machine 100, detects another object within its coverage region and the controller 201 determines that the distance between the respective object detection module 208 and the object is less than the radius R' of the updated swing path 502', then the corresponding portion of the updated swing path 502' (based on the coverage region of the respective object detection module 208) may be displayed with the visual indication indicative of the object present in that region. Therefore, the corresponding portion in the displayed visual representation of the updated range of movement i.e., the swing path 502' may be color coded as red to indicate an obstruction zone for the implement 104 and may additionally include the visual symbol of the detected other object.

INDUSTRIAL APPLICABILITY

As the machine 100 operates at the worksite 102, such as to perform digging and dumping operations, the upper frame 108 rotates relative to the lower frame 106 about the swing axis 116, thereby rotating the implement 104 to perform various operations. While operating, the operator of the machine 100 needs to be aware of the machine 100 and the surroundings of the implement 104 to freely operate the same at the worksite 102.

Figure 9:
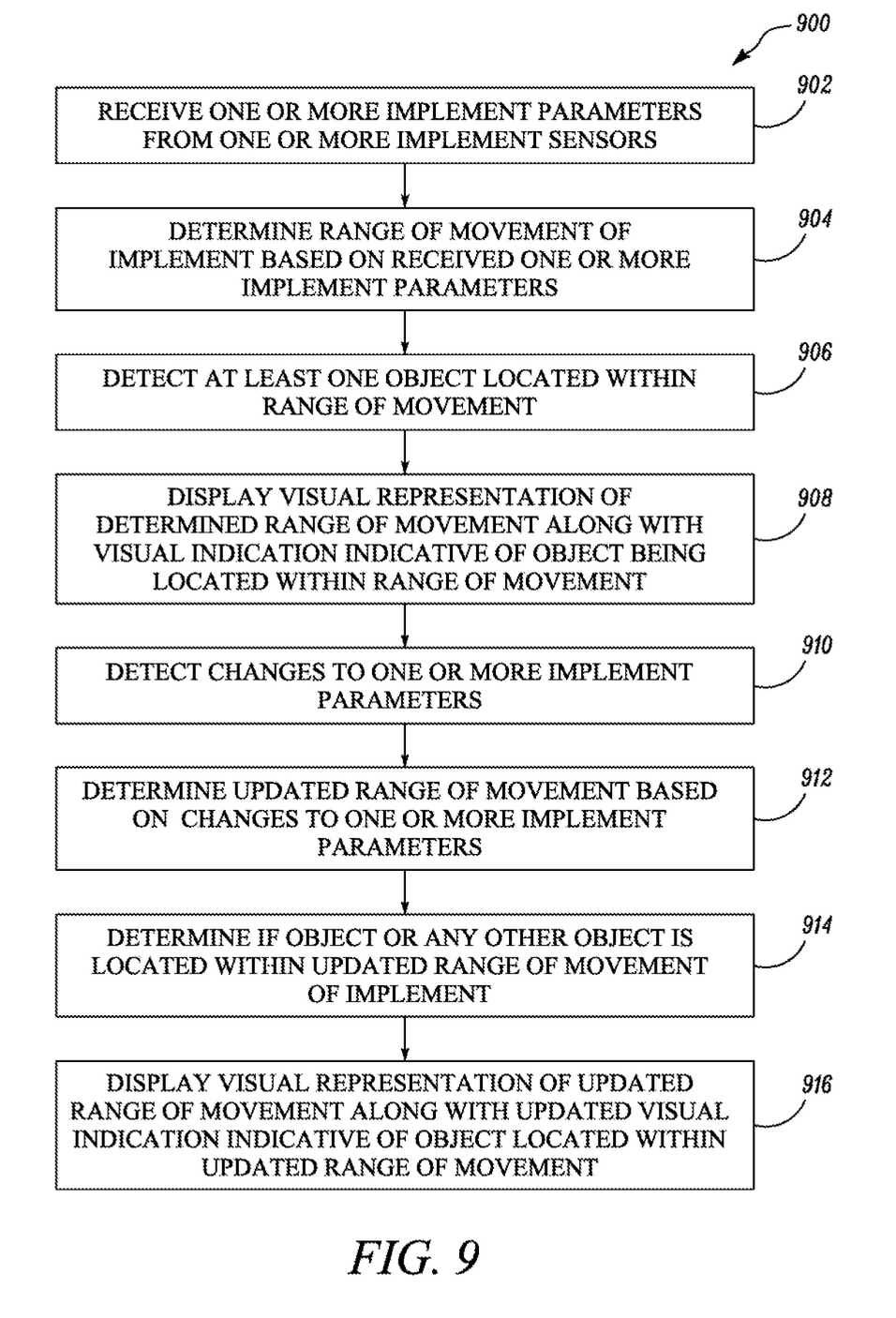
FIG. 9 illustrates an exemplary flowchart of a method for monitoring the implement of the machine, in accordance with the embodiment of the present disclosure.

FIG. 9 illustrates an exemplary method 900 for monitoring the implement 104 of the machine 100. The method 900 may be performed by the controller 201 to monitor the implement 104 and its surroundings to freely operate the same at the worksite 102.

Initially, at step 902, one or more implement parameters are received from the one or more implement sensors 206 positioned on the machine 100 and/or the implement 104. For example, the one or more implement parameters include one or more of the boom angle (angle A), the stick angle (angle B), the work tool angle (angle C), length of the boom 120, the length of the stick 122, etc. In some embodiments, the controller 201 may determine a distance D, D' (shown in FIGS. 3 and 4) between the swing axis 116 of the machine 100 and the tip of the implement extending out from the machine 100 based on the received implement parameters.

At step 904, a range of movement of the implement 104 is determined based on the received one or more implement parameters. For example, the range of movement of the implement 104 may be the circular swing path 502 of the implement 104. In some embodiments, the radius R of the circular swing path 502 (as shown in FIG. 5) is determined based on the distance D, D' between the tip of the implement 104 extending out of the machine 100 and the swing axis 116 of the machine. For example, the radius R of the swing path 502 is equal to or greater than the determined distance D, D'. Based on the distance D, D', the circular swing path 502 is drawn about the swing axis 116 that has the radius R. In some embodiments, a visual representation of the determined range of movement of the implement 104, i.e., the swing path 502 may be further displayed on the display device 212 associated with the machine 100.

Further, at step 906, at least one object, such as the object 504 (shown in FIG. 5), located within the determined range of movement of the implement 104 is detected. For example, one or more of the object detection modules 208 may detect the one or more objects, such as the object 504 proximal to the machine 100 and communicate position data pertaining to the detected object 504 to the controller 201. In one example, the object detection modules 208 may be positioned on the machine 100, and the position data may include a distance D1 between the object 504 and the machine 100. Alternatively, or additionally, the object detection modules 208 may be positioned on the worksite 102 and the position data may include coordinates of location (such as the GPS location coordinates) of the object 504 within the worksite 102. In this case, the controller 201 may determine the distance D1 between the object 504 and the machine 100 based on the GPS location coordinates of the object 504 and the machine 100. Further, the distance D1 between the object 504 and the machine 100 is compared with a threshold value to detect whether the object 504 is located within the range of movement, i.e., the swing path 502 of the implement 104 or not. As explained previously, the threshold value is equal to or greater than the radius R of the determined swing path 502. For example, when the distance D1 is less than the threshold value, then the object 504 is detected to be located within the range of movement of the implement 104. Similarly, when the distance D1 is greater than the threshold value, then the object 504 is detected to be not located within the range of movement of the implement 104. In some other embodiments, the GPS location coordinates of the range of movement i.e., the swing path 502, the machine 100 and the object 504, as received by the controller 201, may be used to detect if the object 504 is located within the swing path 502 or not.

At step 908, a visual representation of the determined range of movement along with a visual indication indicating that the object 504 is located within the range of movement, is displayed on the display device 212 associated with the machine 100. In some embodiments, the visual representation of the swing path 502 may be a three-dimensional (3D) augmented reality representation which is displayed on the display device 212. Further, in some embodiments, the visual indication of the object 504 may include color-coding a portion 508 of the visual representation of the swing path 502 in which the object 504 lies. For example, the portion 508 of the visual representation of the swing path 502, where the object 504 is located may be color coded in red color. On the other hand, the portions of the visual representation of the swing path 502, where there are no objects located, may be color coded as green. Further, in some embodiments, a visual symbol of the detected object 504 may also be displayed within the displayed visual representation of the swing path 502, based on the position data associated with the object 504. For example, the controller 201 may use the location coordinates of the detected object 504 and superimpose the visual symbol of the object 504 on the displayed visual representation of the swing path 502 on the display device 212 associated with the machine 100.

At step 910, changes to one or more implement parameters are detected by the controller 201. It may be contemplated, that during operation of the machine 100 at the worksite 102, the implement 104 may move from one position to another and consequently, one or more implement parameters may change. The changes to the one or more implement parameters may include, but not limited to, change in the position of the work tool 124, the boom 120 and/or the stick 122, the boom angle (angle A), the stick angle (angle B), and the work tool angle (angle C). Any change in any of the implement parameters results in a change in the distance D between the tip of the implement 104 extending out from the machine 100 and the swing axis 116, such as to the distance D'.

Therefore, at step 912, an updated range of movement is determined based on the changes to the one or more implement parameters. In some embodiments, the changed distance D' between the tip of the implement 104 extending out from the machine 100 and the swing axis 116 results in an updated radius R', thereby changing the range of movement, i.e., the swing path 502 to the updated swing path 502'. For example, the controller 201 recalculates the updated swing path 502' having the updated radius R' based on the updated distance D' between the tip of the implement 104 extending out from the machine 100 and the swing axis 116 of the machine 100.

Further, at step 914, it is again determined if the object 504 or any other object is located within the updated range of movement of the implement 104, in a similar manner as performed in step 906. For example, the object detection modules 208 may continuously determine any object proximal to the machine 100 and transmit the signal including position data of any object detected proximal to the machine 100. Based on the position data received from the object detection module 208, the distance between the detected object and the machine 100 is determined and compared with the updated threshold value (updated based on the updated radius R' of the updated swing path 502') to determine if the object is located within the updated swing path 502'.

Furthermore, at step 916, a visual representation of the updated range of movement along with the updated visual indication indicative of an object located within the updated range of movement is displayed on the display device 212 associated with the machine 100. For example, if there is no object located within the updated swing path 502', then the visual representation of the updated swing path 502' may be color coded in green to indicate a clear operating zone for the implement 104. Similarly, if another object is detected within the updated swing path 502', then a corresponding portion of the visual representation of the updated swing path 502' may be color coded in red to indicate an obstruction zone for the implement 104.

The system 200 and the method 800 of monitoring the implement 104 facilitates continuous monitoring of the implement 104 position, its surroundings and helps the operator to identify any object present in the operating ambit of the implement 104 and the machine 100 and accordingly control the operations of the machine 100.

While aspects of the present disclosure have been particularly depicted and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for monitoring an implement of a machine, the method comprising:
 receiving, by a controller, one or more implement parameters associated with the implement, the one or more implement parameters being received from one or more implement sensors;
 determining, by the controller, a range of movement of the implement based on the one or more implement parameters;
 detecting, by the controller and using one or more object detection modules, that at least one object is located within the range of movement of the implement;
 displaying, by the controller and on a three-dimensional augmented reality display implemented on a window of the machine, a three-dimensional augmented reality representation of the determined range of movement of the implement with a visual indication indicative of the at least one object located within the range of movement of the implement;
 detecting, by the controller, one or more changes to at least one implement parameter of the one or more implement parameters;
 determining, by the controller, an updated range of movement of the implement based on detecting the one or more changes;
 determining, by the controller and using the one or more object detection modules, whether the at least one object is located within the updated range of movement of the implement; and
 displaying, by the controller and on the three-dimensional display, a three-dimensional augmented reality representation of the updated range of movement of the implement with an updated visual indication indicative of whether the at least one object is located within the updated range of movement of the implement.

2. The method of claim 1, wherein detecting that the at least one object is located within the range of movement of the implement comprises:
 receiving, by the controller, position data associated with the at least one object from the one or more object detection modules, the position data including a distance between the at least one object and the machine; and
 detecting, by the controller, that the at least one object is located within the range of movement of the implement when the distance between the at least one object and the machine is less than or equal to a threshold value.

3. The method of claim 1, wherein detecting that at least one object is located within the range of movement of the implement comprises:
 receiving, by the controller, position data having location coordinates of the at least one object, from the one or more object detection modules;
 determining, by the controller, a distance between the at least one object and the machine based on the location coordinates of the at least one object; and
 determining, by the controller, that the at least one object is located within the range of movement of the implement when the distance is less than or equal to a threshold value.

4. The method of claim 1, wherein the implement includes a boom coupled to the machine, a stick coupled to the boom and a work tool coupled to the stick, and wherein the one or more implement parameters include one or more of:
 an angle between the stick and the work tool,
 an angle between the boom and the machine,
 an angle between the stick and the boom,
 a length of the boom, or
 a length of the stick.

5. The method of claim 4, wherein the range of movement of the implement is a swing path of the implement and wherein determining the range of movement of the implement comprises determining, by the controller, a radius of the swing path based on the one or more implement parameters.

6. The method of claim 1, wherein displaying the updated visual indication comprises:
 receiving, by the controller, updated position data associated with the at least one object, the updated position data including an updated distance between the at least one object and the machine; and
 displaying, by the controller on the display device, the updated visual indication indicative of the at least one object located within the updated range of movement of the implement based on the updated position data and when the updated distance is less than or equal to a threshold value.

7. A system for monitoring an implement of a machine, the system comprising:
 one or more implement sensors configured to monitor one or more implement parameters associated with the implement;
 one or more object detection modules configured to detect at least one object proximal to the machine and generate a signal including position data associated with the at least one object; and
 a controller communicably coupled to the one or more implement sensors and the one or more object detection modules, the controller being configured to:
  receive the one or more implement parameters associated with the implement, from the one or more implement sensors;
  determine a range of movement of the implement based on the one or more implement parameters;
  detect, using the one or more object detection modules, that at least one object is located within the range of movement of the implement based on the position data associated with the at least one object;
  display, on a three-dimensional augmented reality display implemented on a window of the machine, a three-dimensional augmented reality representation of the determined range of movement of the implement with a visual indication indicative of the at least one object located within the range of movement;
  detect one or more changes to at least one implement parameter of the one or more implement parameters;
  determine an updated range of movement based on the detected one or more changes;
  determine, using the one or more object detection modules, whether the at least one object is located within the updated range of movement of the implement; and
  display, on the three-dimensional augmented reality display, a three-dimensional augmented reality representation of the updated range of movement of the implement with an updated three-dimensional augmented reality representation indicative of whether the at least one object is located within the updated range of movement of the implement.

8. The system of claim 7, wherein the position data includes a distance between the at least one object and the machine, and wherein the controller is configured to detect that the at least one object is located within the range of movement of the implement when the distance between the at least one object and the machine is less than or equal to a threshold value.

9. The system of claim 7, wherein the position data includes location coordinates of the at least one object and wherein the controller is configured to:
 determine a distance between the at least one object and the machine based on the location coordinates of the at least one object; and
 detect that the at least one object is located within the range of movement of the implement when the distance is less than or equal to a threshold value.

10. The system of claim 7, wherein the implement includes a boom coupled to the machine, a stick coupled to the boom and a work tool coupled to the stick, and wherein the one or more implement parameters include one or more of:
 an angle between the stick and work tool,
 an angle between the boom and the machine,
 an angle between the stick and the boom,
 a length of the boom, or
 a length of the stick.

11. The system of claim 10, wherein the range of movement of the implement is a swing path of the implement and the controller is configured to determine a radius of the swing path based on the one or more implement parameters.

12. The system of claim 7, wherein the controller is further configured to:
 receive an updated position data associated with the at least one object, using the one or more object detection modules, the updated position data including an updated distance between the at least one object and the machine; and
 display, on the three-dimensional augmented reality display, the updated three-dimensional augmented reality representation indicative of the at least one object located within the updated range of movement of the implement based on the updated position data and when the updated distance is less than or equal to a threshold value.

13. A machine comprising;
 an implement comprising a boom coupled to the machine, a stick coupled to the boom, and a work tool coupled to the stick;
 one or more implement sensors configured to monitor one or more implement parameters associated with the implement, wherein the one or more implement parameters include one or more of an angle between the stick and work tool, an angle between the boom and the machine, an angle between the stick and the boom, a length of the boom, or a length of the stick;
 one or more object detection modules configured to detect at least one object proximal to the machine and generate a signal including position data associated with the at least one object, the position data including a distance between the machine and the at least one object; and
 a controller communicably coupled to the one or more implement sensors and the one or more object detection modules, the controller being configured to:
  receive the one or more implement parameters associated with the implement, from the one or more implement sensors;
  determine a range of movement of the implement based on the one or more implement parameters;
  detect, using the one or more object detection modules, whether at least one object is located within the range of movement of the implement based on the position data associated with the at least one object;

display, on a three-dimensional augmented reality display implemented on a window of the machine, a three-dimensional augmented reality representation of the determined range of movement of the implement with a three-dimensional augmented reality representation indicative of whether the at least one object is located within the range of movement of the implement;

detect one or more changes to at least one implement parameter of the one or more implement parameters;

determine an updated range of movement of the implement based on the detected one or more changes;

determine, using the one or more object detection modules, whether the at least one object is located within the updated range of movement of the implement; and display, on the three-dimensional augmented reality display, a three-dimensional augmented reality representation of the updated range of movement of the implement with an updated three-dimensional augmented reality representation indicative of whether the at least one object is located within the updated range of movement of the implement.

14. The machine of claim 13, wherein the controller is configured to detect that the at least one object is located within the range of movement of the implement when the distance between the at least one object and the machine is less than or equal to a threshold value.

15. The machine of claim 13, wherein the range of movement of the implement is a swing path of the implement and wherein the controller is configured to determine a radius of the swing path based on the one or more implement parameters.

16. The machine of claim 13, wherein the controller is further configured to:

receive updated position data associated with the at least one object, using the one or more object detection modules, the updated position data including an updated distance between the at least one object and the machine; and display, on the three-dimensional augmented reality display, the updated three-dimensional augmented reality representation indicative of the at least one object located within the updated range of movement of the implement based on the updated position data and when the updated distance is less than or equal to a threshold value.

\* \* \* \* \*